(12) United States Patent
Kawano

(10) Patent No.: US 11,801,903 B2
(45) Date of Patent: Oct. 31, 2023

(54) CAR BODY PANEL STRUCTURE

(71) Applicant: Honda Motor Co., Ltd., Tokyo (JP)

(72) Inventor: Yuya Kawano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 111 days.

(21) Appl. No.: 17/669,358

(22) Filed: Feb. 11, 2022

(65) Prior Publication Data

US 2022/0297766 A1  Sep. 22, 2022

(30) Foreign Application Priority Data

Mar. 18, 2021  (CN) .......................... 202110290369.0

(51) Int. Cl.
  *B62D 25/20*  (2006.01)
(52) U.S. Cl.
  CPC .................. *B62D 25/20* (2013.01)
(58) Field of Classification Search
  CPC ..... E05D 3/16; E05D 2003/163; E05D 15/46; B62D 25/12; B62D 25/105; E05Y 2201/624; E05Y 2900/536

USPC ...................................................... 296/193.11
See application file for complete search history.

(56) References Cited

U.S. PATENT DOCUMENTS

2019/0016394 A1 *  1/2019  Han ................... B62D 25/2018

FOREIGN PATENT DOCUMENTS

| CN | 215043133 U | * 12/2021 | |
| JP | 2012011959 A | * 1/2012 | ......... B62D 25/2045 |
| JP | 2012011960 | 1/2012 | |
| WO | WO-2011162047 A1 | * 12/2011 | ............. B62D 25/08 |

* cited by examiner

*Primary Examiner* — Pinel E Romain
(74) *Attorney, Agent, or Firm* — JCIPRNET

(57) ABSTRACT

The disclosure provides a car body panel structure. The car body panel structure includes multiple beads disposed on the car body panel and separated by multiple ridges formed on the car body panel. Each of the beads is formed in a zigzag shape. The beads are all not in contact with the ridges.

7 Claims, 2 Drawing Sheets

CAR BODY PANEL STRUCTURE

CROSS-REFERENCE TO RELATED APPLICATION

This application claims the priority benefit of China application serial no. 202110290369.0, filed on Mar. 18, 2021. The entirety of the above-mentioned patent application is hereby incorporated by reference herein and made a part of this specification.

BACKGROUND

Technical Field

The disclosure relates to a car body panel structure, and particularly relates to a car body panel structure of a vehicle.

Description of Related Art

In the vehicle manufacturing industry in the prior art, generally, a car body has a cabin (car interior) for passengers and an engine compartment configured in front of the cabin and accommodating an engine, etc., and a floor panel is provided on the lower surface of the cabin. In the engine compartment, a pair of front side frames constituting left and right frame parts extend along a front-rear direction. In addition, the floor panel is supported by a floor frame extending along the front-rear direction below the floor panel. Furthermore, a pair of front pillars and a pair of side sills are continuously formed at two corner parts of a front part of the cabin in a width direction of the car body, and a cowl board with a closed cross-sectional structure extending along the width direction is mounted between upper parts of the pair of front pillars. In addition, on a part surrounded by the floor panel and the cowl board, a dashboard lower section (dash panel) separating the engine compartment and the cabin is provided. Furthermore, rear ends of the pair of front side frames are connected to the dashboard lower section.

Here, the dashboard lower section is only a part separating the engine compartment and the cabin. Therefore, in many cases, the dashboard lower section formed by processing a thin plate is used to form for weight reduction. Therefore, the dashboard lower section has issues such as insufficient rigidity, and during driving, the dashboard lower section may also generate membrane vibration. Therefore, in the prior art, the rigidity is improved by fixing a reinforcing plate to the dashboard lower section.

In the prior art, in addition to disposing the reinforcing plate on the dashboard lower section, longitudinal linear protrusions are also disposed to improve the rigidity of the dashboard lower section and suppress the possible membrane vibration of the dashboard lower section.

In the prior art, when a vehicle is driven, longitudinal linear protrusions are disposed in order to suppress the membrane vibration of a dashboard lower section. However, the membrane vibration input from a width direction of a car body cannot be suppressed, and in order to improve rigidity, a reinforcing plate needs to be fixed to a panel surface of the dashboard lower section in the prior art, which leads to the complexity of the manufacturing process and increases the manufacturing cost.

In view of the above aspects, the disclosure provides a car body panel structure, which only changes the shape of the existing car body panel, that is, the reinforcing plate that needs to be fixed to the car body panel in the prior art is no longer required, which saves the manufacturing cost, and in addition to suppressing the membrane vibration input from an up-down direction of the car body, the membrane vibration from the width direction of the car body can also be suppressed.

SUMMARY

The disclosure provides a car body panel structure, which includes multiple beads disposed on a car body panel and separated by multiple ridges formed on the car body panel. The bead is formed in a zigzag shape. The beads are all not in contact with the ridges.

In order for the features and advantages of the disclosure to be more comprehensible, specific embodiments are described in detail as follows in conjunction with drawings.

DETAILED DESCRIPTION OF DISCLOSED EMBODIMENTS

Figure 1:
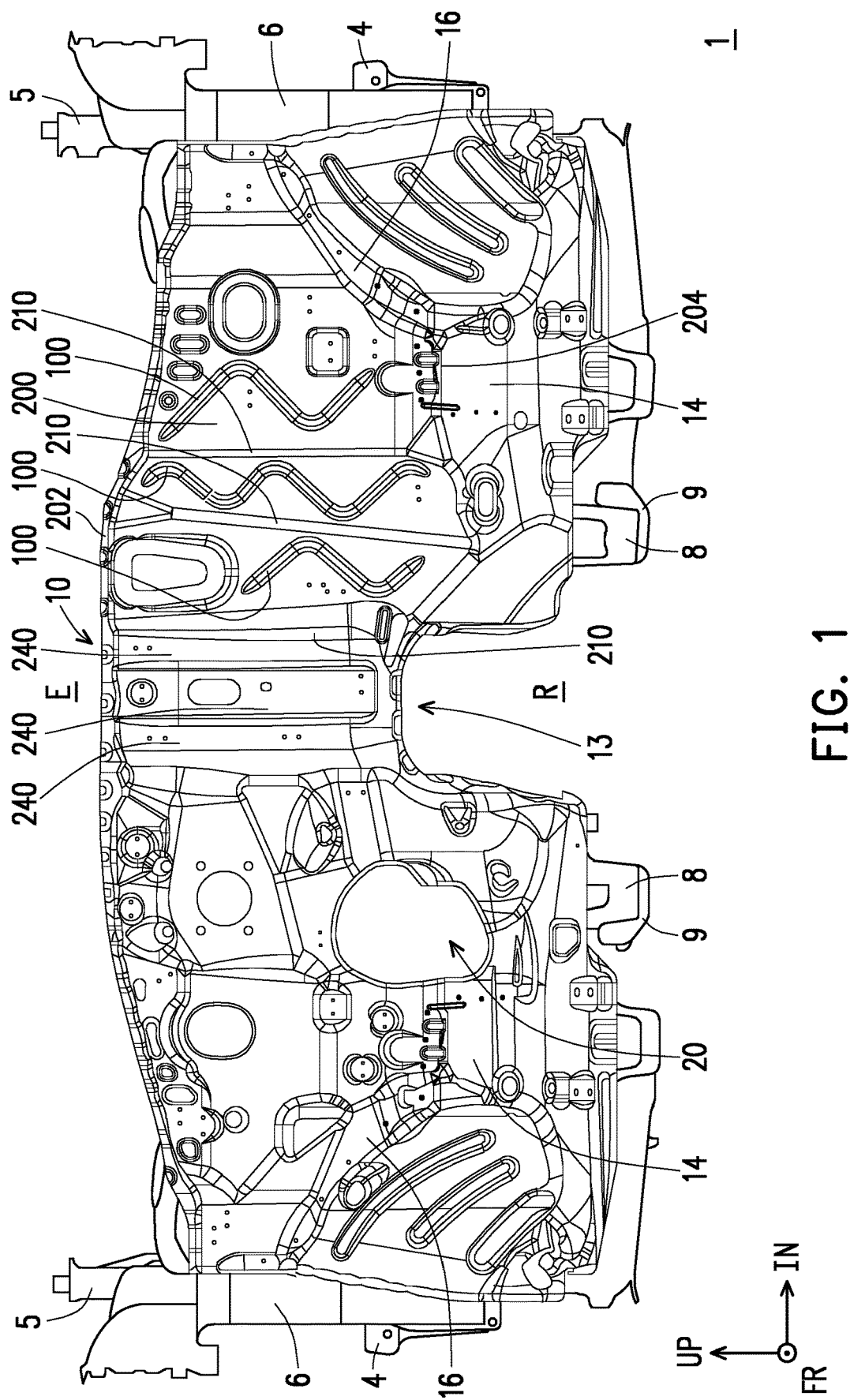
FIG. 1 is a schematic diagram of a car body panel structure according to an embodiment of the disclosure.

Hereinafter, embodiments of the disclosure will be described based on the drawings. It should be noted that in each embodiment described below, the same reference numerals are given to common parts, and repeated descriptions are omitted. Hereinafter, embodiments of the disclosure will be described with reference to the drawings. In the embodiments described below, when mentioning a number, an amount, etc., the scope of the disclosure is not necessarily limited to the number, the amount, etc. unless particularly described. In addition, in the following embodiments, each constituent element is not necessarily essential to the disclosure unless particularly described. In addition, when there are multiple embodiments below, the characteristic parts of the embodiments that can be appropriately combined are predetermined from the beginning unless particularly described.

With reference to the drawings, a car body panel structure of each embodiment of the disclosure will be described. FR in each drawing represents a front direction of a front-rear direction of a vehicle, UP represents an upper direction of an up-down direction of the vehicle, and IN represents an inner side direction of a width direction of the vehicle. In addition, directions and positions described in the specification of the disclosure are all defined on the premise that the front of the vehicle is facing forward.

Figure 2:
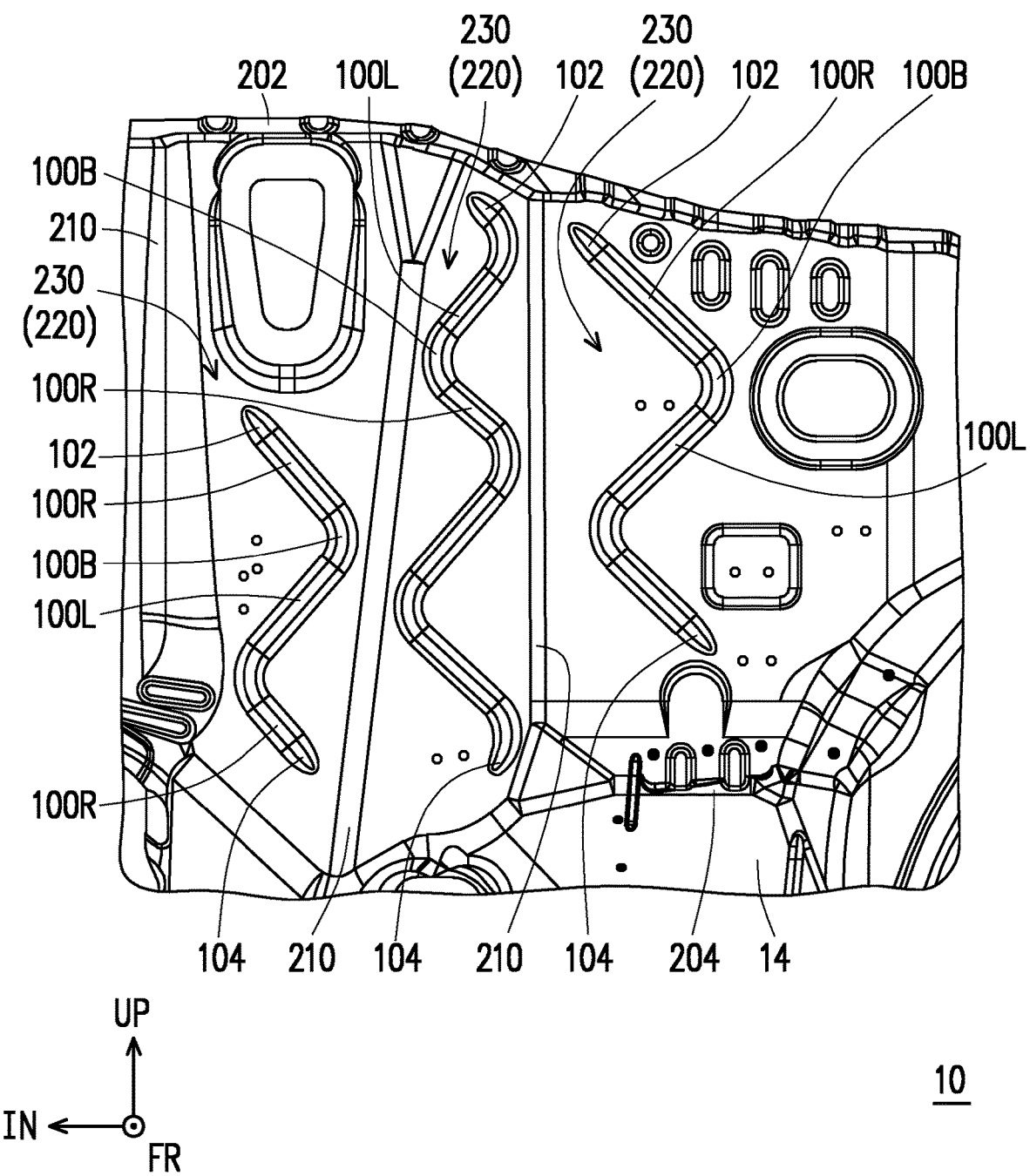
FIG. 2 is a partially enlarged schematic diagram of the car body panel structure of FIG. 1.

FIG. 1 is a schematic diagram of a car body panel structure according to an embodiment of the disclosure. FIG. 2 is a partially enlarged schematic diagram of the car body panel structure of FIG. 1. In FIG. 1 and FIG. 2, the direction out of plane of paper represents a rear direction of the vehicle, and the direction into plane of paper represents the front direction of the vehicle.

As shown in FIG. 1, a car body panel structure 1 has front side frames 4 configured at the front and constituting left and right frame parts of an engine compartment E; front pillars 5 configured behind the front side frames 4 and with left and right outer sides extending along the up-down direction; upper members 6 configured above the two front side frames 4, with each front end bonded to a front end of the front side frame 4, and with each rear end bonded to the front pillar 5;

a dash panel 200 separating the engine compartment E and a cabin R configured behind the engine compartment E and bonded to the front side frames 4, the front pillars 5, and the upper members 6.

The dash panel 200 is a component formed by performing a pressing operation, etc. on a flat member (for example, a metal member). Wheel housings 16 are respectively provided on left and right sides of the dash panel 200. Each wheel housing 16 is formed such that each wheel housing 16 bulges toward the cabin R side. In addition, floor panels 9 are bonded to a flange part of a lower part of the dash panel 200. Also, the floor panels 9 are bonded to side sills 8 configured at left and right sides thereof and respectively extending along the front-rear direction. Moreover, the floor panels 9 are supported by a floor frame configured below and extending along the front-rear direction. At a center part in a width direction of the dash panel 200, a tunnel part 13 bulging upward is integrally formed. Toe boards 14 are disposed on left and right sides of the tunnel part 13. In addition, at a position between the toe board 14 and a center part of the dash panel 200, a steering opening part 20 that communicating the engine compartment E and the cabin R is formed. The steering opening part 20 is configured to penetrate a steering shaft of the vehicle.

Please refer to FIG. 1 and FIG. 2. A car body panel 10 of the car body panel structure 1 includes the car body panel 10 and multiple beads 100 disposed on the car body panel 10. Multiple ridges 210 are formed on the car body panel 10. The ridges 210 divide the dash panel 200 of the car body panel 10 into multiple regions. The beads 100 are respectively separated by the ridges 210. In the embodiment, three ridges 210 and three corresponding beads 100 are disposed on the car body panel 10 as an example, but the disclosure is not limited thereto, and the number of ridges and beads disposed may be adjusted according to actual requirements.

As shown in FIG. 1 and FIG. 2, each bead 100 is disposed in a region separated or divided by each ridge 210, and the beads 100 are all not in contact with the ridges 210. In other words, each bead 100 is disposed such that the bead 100 does not cut the ridge 210. In this way, the beads 100 are respectively located in regions divided by the ridges 210 of the dash panel 200 of the car body panel 10, and the beads 100 are all not in contact with the ridges 210. Therefore, the overall rigidity of the car body panel structure 1 can be improved. Accordingly, the design only changes the shape of the existing car body panel 10 and does not need to be configured with an additional reinforcing plate to suppress membrane vibration that may be generated by the car body panel 10 and improve the overall structural strength of the car body panel structure 1.

In addition, as shown in FIG. 2, each bead 100 is, for example, a protrusion formed in a zigzag shape or a wave shape. Since the bead 100 is formed in a zigzag shape or a wave shape, the membrane vibration input from the engine compartment E or the up-down direction and the width direction of a car body can be suppressed. The dash panel is usually connected to various surrounding components such as the front side frames, the front pillars, and a cowl board, so vibration from the surrounding components is input to the dash panel. Since the bead 100 is disposed on the dash panel 200 and is formed in a zigzag shape or a wave shape, the membrane vibration input from all directions of the dash panel 200 can be suppressed. In the embodiment, the forming manner of the bead 100 is to form an arc-shaped (substantially semicircular) cross-sectional shape by, for example, a pressing operation or compression molding. The bead 100 may be formed such that a surface on the cabin R side of the car body panel 10 is concave or may be formed such that a surface on the cabin R side of the car body panel 10 is protruding. The example cited in the embodiment may be seen in FIG. 2. As shown in FIG. 2, the leftmost bead 100 (that is, the bead 100 closest to the tunnel part 13) and the bead 100 located in the middle among the three beads 100 have surfaces on the cabin R side of the car body panel 10 that are concave, that is, surfaces on the engine compartment E side of the car body panel 10 are protruding. The rightmost bead 100 (that is, the bead 100 closest to the wheel housing 16) has a surface on the cabin R side of the car body panel 10 that is protruding, that is, a surface on the engine compartment E side of the car body panel 10 is concave. However, the disclosure is not limited thereto.

In addition, since the bead 100 is formed in a zigzag shape or a wave shape, the membrane vibration from the up-down direction and the width direction of the car body can be suppressed. Through disposing the zigzag-shaped or wave-shaped beads 100 to be not in contact with the ridges 210, the overall structural strength of the car body panel structure 1 can be improved, and the zigzag-shaped beads 100 may also be easily formed on the dash panel 200 by a pressing operation, thereby simplifying the manufacturing process of the car body panel 10, which can greatly reduce the manufacturing cost.

Please refer to FIG. 2. The dash panel 200 of the car body panel 10 has at least a vertical surface 220 protruding in the front-rear direction. At least two elongated panel surfaces 230 extending in the up-down direction of the car body are formed on the vertical surface 220. The bead 100 is disposed on the elongated panel surface 230 and extends in the up-down direction. In the embodiment, three elongated panel surfaces 230 that are not coplanar with each other are formed on the vertical surface 220 as an example. For example, each elongated panel surface 230 is formed such that the elongated panel surface 230 is surrounded by the ridge 210 and an upper end edge and a lower end edge of the dash panel 200. Each bead 100 is formed in each elongated panel surface 230 in a manner of extending along the up-down direction, and the bead 100 does not cut the ridge 210. In more detail, as shown in FIG. 2, each bead 100 has a first rib part 100R extending toward a direction of the width direction along with the up-down direction (FIG. 2 schematically exemplifies a part extending in a direction from the upper left to the lower right as the first rib part 100R) and a second rib part 100L extending toward another direction of the width direction along with the up-down direction (FIG. 2 schematically exemplifies a part extending in a direction from the upper right to the lower left as the second rib part 100L).

In this way, the overall structural strength of the car body panel structure 1 can be improved, and the vibration directly input from the front pillars 5 and the front side frames 4 and the vibration caused by sound radiation from an engine, a motor, etc. can be effectively suppressed.

In addition, the vertical surface 220 protrudes in the front-rear direction. For example, in FIG. 2, a part of the vertical surface 220 forming the rightmost elongated panel surface 230 protrudes toward the engine compartment E, so that the space of the cabin R is expanded. On the other hand, a part of the vertical surface 220 forming the leftmost elongated panel surface 230 protrudes toward the cabin R, so that the space of the engine compartment E is expanded.

In this way, through disposing the vertical surface 220 protruding in the front-rear direction, the structural strength of the dash panel 200 can be increased on the one hand, and the part of the dash panel 200 protruding toward the cabin R has the effect of expanding the space of the engine compartment E, so that the engine compartment E can have the function of accommodating engine parts. The part of the dash panel 200 protruding toward the engine compartment E has the effect of expanding the space of the cabin R.

In addition, each bead 100 includes a curved part 100B connecting the first rib part 100R and the second rib part 100L. The curved part 100B is configured along the ridge 210. As shown in FIG. 2, the curved part 100B is formed such that the curved part 100B gently curves along a longitudinal direction of the ridge 210 and smoothly connects the first rib part 100R and the second rib part 100L to prevent the shape structure from having a sharp corner, which causes stress concentration.

In this way, through disposing the curved part 100B connecting the first rib part 100R and the second rib part 100L along the ridge 210, the bead 100 can be formed in the largest region (for example, in the largest area of the elongated panel surface 230) where the bead 100 does not cut the ridge 210, that is, the bead 100 is used to fill the largest area of the elongated panel surface 230, which can effectively improve the overall rigidity of the car body panel structure 1 and more effectively suppress the membrane vibration of the car body panel structure 1.

In more detail, as shown in FIG. 2, each bead 100 is formed such that an upper end part 102 of the bead 100 extends to a border part 202 between the dash panel 200 and a cowl board part not shown, and a lower end part 104 of the bead 100 extends to a bent part 204 between the vertical surface 220 and a toe board 14, and the upper end part 102 and the lower end part 104 are both not in contact with the ridge 210. Each bead 100 is disposed to meanderingly extend in a zigzag shape or a wave shape from the vicinity of the border part 202 of an upper edge of the dash panel 200 to the vicinity of the toe board 14 in the up-down direction. In this way, the bead 100 is used to fill the largest region without cutting the ridge 210, and the bead 100 can be formed in the largest region without cutting the ridge 210, which can effectively improve the overall rigidity of the car body panel structure 1 and more effectively suppress the membrane vibration of the car body panel structure 1.

In addition, the bead 100 is formed such that end parts (that is, the upper end part 102 and the lower end part 104) in the longitudinal direction of the bead 100 have a tapered shape. As shown in FIG. 2, the upper end part 102 and the lower end part 104 of the bead 100 are both formed such that cross sections of parts gradually become smaller toward end points. In this way, the productivity of the pressing operation of the car body panel 10 can be improved. For example, the shape of a mold used in the pressing operation is simple, so the manufacturing and maintenance operations of the mold become simple, thereby improving the productivity of the pressing operation of the car body panel 10.

In the embodiment, a slot 240 extending along the up-down direction and configured adjacent to the bead 100 is formed at a center part in the width direction of the dash panel 200. Please refer to FIG. 1. At the center part of the dash panel 200 and above the tunnel part 13, the slots 240 (two are shown in FIG. 1 as an example) extending substantially straight along the up-down direction and protruding toward the engine compartment E are formed, and the slot 240 extending substantially straight along the up-down direction and protruding toward the cabin R is also formed (one is shown in FIG. 1 as an example). In this way, through forming the slot 240 extending along the up-down direction and configured adjacent to the bead 100 at the center part of the dash panel 200, in addition to increasing the surface rigidity of the dash panel 200, electrical parts can also be installed in the engine compartment E or the cabin R.

In the embodiment, when positions of the beads 100 formed on the dash panel 200 are viewed as a whole, the bead 100 is disposed closer to an inner side of the car body than the wheel housing 16 of the car body panel 10 in the width direction. As shown in FIG. 1, in a region surrounded by the center part of the dash panel 200 and the toe boards 14 and the wheel housings 16 below, the dash panel 200 have the ridges 210 extending substantially along the up-down direction. The ridges 210 divide the region into the elongated panel surfaces 230. In this way, compared with other parts, the elongated panel surfaces 230 have flatter panel surfaces, and forming the bead 100 on each elongated panel surface 230 can improve the rigidity of the dash panel 200. In addition, the bead 100 is disposed closer to the inner side of the car body than the wheel housing 16. As shown in FIG. 1, formation positions of the beads 100 are all on an inner side of the wheel housing 16 and will not exceed the wheel housing 16. In this way, the rigidity of the dash panel 200 and the wheel housings 16 can be improved, and the membrane vibration of the dash panel 200 can be suppressed.

In summary, in the car body panel structure 1 of the disclosure, the beads 100 are disposed on the car body panel 10 and the beads 100 are respectively separated by the ridges 210 formed on the car body panel 10. In addition, each bead 100 is formed in a zigzag shape. The beads 100 are not in contact with the ridges 210. Therefore, the membrane vibration from the up-down direction and the width direction of the car body can be suppressed, which can improve the overall rigidity of the car body panel structure 1. Accordingly, the design only changes the shape of the existing car body panel 10, that is, the reinforcing plate that needs to be fixed to the car body panel in the prior art is no longer required, which saves the manufacturing cost, and in addition to suppressing the membrane vibration input from the up-down direction of the car body, the membrane vibration from the width direction of the car body can also be suppressed, and the overall structural strength of the car body panel structure 1 can be improved.

According to the disclosure, the beads are disposed on the car body panel and the beads are respectively separated by the ridges formed on the car body panel. In other words, the beads are respectively located in regions divided by the ridges of the car body panel. In addition, each bead is formed in a zigzag shape. The beads are not in contact with the ridges. Since each of the beads is formed in a zigzag shape, the membrane vibration from the up-down direction and the width direction of the car body can be suppressed. Since the beads are all not disposed in contact with the ridges, the overall rigidity of the car body panel structure can be improved. Accordingly, the design only changes the shape of the existing car body panel and does not need to be configured with an additional reinforcing plate to suppress the membrane vibration that may be generated by the car body panel and improve the overall structural strength of the car body panel structure. In addition, the zigzag-shaped beads may be easily disposed by a pressing operation, thereby simplifying the manufacturing process of the car body panel, which can greatly reduce the manufacturing cost.

In addition, in the disclosure, a dash panel of the car body panel includes at least a vertical surface protruding in a front-rear direction of the car body. At least two elongated panel surfaces extending in the up-down direction of the car body are formed on the vertical surface. The beads are disposed on the elongated panel surfaces and extend in the up-down direction. Each bead has a first rib part that extends toward a direction of the width direction of the car body along with the up-down direction and a second rib part that extends toward another direction of the width direction along with the up-down direction.

According to the above structure, through respectively disposing the beads on the elongated panel surfaces extending in the up-down direction of the dash panel, the overall rigidity of the dash panel can be improved. Through configuring each bead to extend in the up-down direction, the vibration directly input from front pillars and front side frames and the vibration caused by sound radiation from an engine, a motor, etc. can be effectively suppressed. In addition, through disposing the vertical surface protruding in the front-rear direction, the structural strength of the dash panel can be increased, and a part of the dash panel protruding toward a cabin has the effect of expanding the space of an engine compartment, so that the engine compartment can have the function of accommodating engine parts. A part of the dash panel protruding toward the engine compartment has the effect of expanding the space of the cabin.

In addition, in the disclosure, each of the beads includes a curved part connecting the first rib part and the second rib part. The curved part is configured along the ridge.

According to the structure, through disposing the curved part connecting the first rib part and the second rib part along the ridge, the bead can be formed in the largest region where the bead does not cut the ridge, which can effectively improve the overall rigidity of the car body panel structure and more effectively suppress the membrane vibration of the car body panel structure.

Moreover, in the disclosure, an upper end part of each of the beads extends to a border part between the dash panel and a cowl board part, a lower end part of each of the beads extends to a bent part between the vertical surface and a toe board, and the upper end part and the lower end part are not in contact with the ridge.

According to the structure, through disposing the bead such that the upper end part of the bead extends to the vicinity of the cowl board part and the lower end part of the bead extends to the vicinity of the toe board, that is, through disposing each bead with a zigzag shape to extend from the cowl board part to the toe board in the up-down direction, the bead can be formed in the largest region where the bead does not cut the ridge, which can effectively improve the overall rigidity of the car body panel structure and more effectively suppress the membrane vibration of the car body panel structure.

Furthermore, in the disclosure, each of the beads is formed such that an end part in a longitudinal direction of each bead has a tapered shape.

According to the above structure, through forming each bead such that the end parts (upper end part and lower end part) in the longitudinal direction of the bead has a tapered shape, the productivity of a pressing operation of the car body panel can be improved. For example, the shape of a mold used in the pressing operation is simple, so the manufacturing and maintenance operations of the mold become simple, thereby improving the productivity of the pressing operation of the car body panel.

In addition, in the disclosure, a slot extending along the up-down direction and configured adjacent to the beads is formed at a center part in a width direction of the dash panel.

According to the above structure, through forming the slot extending along the up-down direction and configured adjacent to the beads at the center part in the width direction of the dash panel, in addition to increasing the surface rigidity of the dash panel, electrical parts can also be installed in the engine compartment or the cabin.

In addition, in the disclosure, each of the beads is disposed to be closer to an inner side of the car body than a wheel housing of the car body panel in the width direction.

According to the structure, through disposing the bead to be closer to the inner side of the car body than the wheel housing of the car body panel in the width direction, the rigidity of the dash panel and the wheel housing can be improved, and the membrane vibration of the dash panel can be suppressed.

Based on the above, in the car body panel structure of the disclosure, the beads are disposed on the car body panel, the beads are respectively separated by the ridges formed on the car body panel, each bead is formed in a zigzag shape, and the beads are all not in contact with the ridges. Therefore, the membrane vibration from the up-down direction and the width direction of the car body can be suppressed, and the overall rigidity of the car body panel structure can be improved. Accordingly, the design only changes the shape of the existing car body panel and does not need to be configured with an additional reinforcing plate to suppress the membrane vibration that may be generated by the car body panel and improve the overall structural strength of the car body panel structure.

Finally, it should be noted that the above embodiments are only used to illustrate, but not to limit, the technical solutions of the disclosure. Although the disclosure has been described in detail with reference to the above embodiments, persons skilled in the art should understand that they can still modify the technical solutions described in the above embodiments or equivalently replace some or all of the technical features, but the modifications or replacements do not cause the essence of the corresponding technical solutions to deviate from the scope of the technical solutions of the embodiments of the disclosure.

What is claimed is:

1. A car body panel structure, comprising:
    a plurality of beads, disposed on a car body panel and separated by a plurality of ridges formed on the car body panel, wherein
    each of the beads is formed in a zigzag shape, and the beads are all not in contact with the ridges.

2. The car body panel structure according to claim 1, wherein:
    a dash panel of the car body panel has at least one vertical surface protruding in a front-rear direction of a car body, and at least two elongated panel surfaces extending in an up-down direction of the car body are formed on the vertical surface,
    each of the beads is disposed on the elongated panel surface and extends in the up-down direction, and each of the beads has a first rib part extending toward a direction of a width direction of the car body along with the up-down direction and a second rib part extending toward another direction of the width direction along with the up-down direction.

3. The car body panel structure according to claim 2, wherein:
    each of the beads has a curved part connecting the first rib part and the second rib part, and the curved part is configured along the ridge.

4. The car body panel structure according to claim 2, wherein:
    an upper end part of each of the beads extends to a border part between the dash panel and a cowl board part, a lower end part of each of the beads extends to a bent part between the vertical surface and a toe board, and the upper end part and the lower end part are both not in contact with the ridge.

5. The car body panel structure according to claim 1, wherein:
   each of the beads is formed such that an end part in a longitudinal direction of each of the beads has a tapered shape.

6. The car body panel structure according to claim 3, wherein:
   a slot extending along the up-down direction and configured adjacent to the beads is formed at a center part in the width direction of the dash panel.

7. The car body panel structure according to claim 2, wherein:
   each of the beads is disposed to be closer to an inner side of the car body than a wheel housing of the car body panel in the width direction.

\* \* \* \* \*